US012759098B2

(12) United States Patent
Matsui

(10) Patent No.: US 12,759,098 B2
(45) Date of Patent: Oct. 13, 2026

(54) CAVITATION PROCESSING METHOD AND CAVITATION PROCESSING APPARATUS

(71) Applicant: SUGINO MACHINE LIMITED, Namerikawa City (JP)

(72) Inventor: Taiki Matsui, Namerikawa City (JP)

(73) Assignee: SUGINO MACHINE LIMITED, Namerikawa City (JP)

( * ) Notice: Subject to any disclaimer, the term of this patent is extended or adjusted under 35 U.S.C. 154(b) by 277 days.

(21) Appl. No.: 18/641,390

(22) Filed: Apr. 21, 2024

(65) Prior Publication Data

US 2024/0359274 A1 Oct. 31, 2024

(30) Foreign Application Priority Data

Apr. 28, 2023 (JP) ................................ 2023-074643

(51) Int. Cl.

| | |
|---|---|
| ***B23P 9/04*** | (2006.01) |
| ***B08B 3/02*** | (2006.01) |
| ***B08B 9/032*** | (2006.01) |
| ***B24C 1/04*** | (2006.01) |
| ***B24C 1/08*** | (2006.01) |
| ***B24C 1/10*** | (2006.01) |
| ***B24C 3/32*** | (2006.01) |

(Continued)

(52) U.S. Cl.

CPC *B23P 9/04* (2013.01); *B08B 3/02* (2013.01); *B08B 9/0321* (2013.01); *B24C 1/04* (2013.01); *B24C 1/08* (2013.01); *B24C 3/325* (2013.01); *B24C 9/00* (2013.01); *C21D 7/06* (2013.01); *B24C 1/10* (2013.01)

(58) Field of Classification Search

CPC .. B24C 3/325; B24C 1/04; B24C 1/08; B24C 1/10; B24C 9/00; B23P 9/04; B08B 3/02; B08B 9/0321; C21D 7/06

See application file for complete search history.

(56) References Cited

U.S. PATENT DOCUMENTS

| | | | | |
|---|---|---|---|---|
| 6,189,356 | B1 * | 2/2001 | Simeone | B24C 1/10 29/90.7 |
| 2023/0029286 | A1 * | 1/2023 | Sanders | B33Y 40/20 |

FOREIGN PATENT DOCUMENTS

| | | | |
|---|---|---|---|
| EP | 1127945 | A2 | 8/2001 |
| JP | 2007-050492 | A | 3/2007 |

(Continued)

OTHER PUBLICATIONS

Japanese Office Action mailed on Dec. 26, 2023 in a corresponding Japanese Patent Application No. 2023-074643 (4 pages).

(Continued)

*Primary Examiner* — Bobby Yeonjin Kim

(74) *Attorney, Agent, or Firm* — United IP Counselors, LLC

(57) ABSTRACT

The cavitation process is performed on the inner surface of the target hole. The cavitation processing method includes; attaching a cap having a through hole to an inlet of a target hole of a workpiece; immersing the workpiece and a nozzle into a processing liquid; and ejecting a jet of the processing liquid from the nozzle located outside of the target hole to an inside of the target hole through the through hole such that a cavitation process is performed on a processing region that is located downstream of a non-processing region covered by the cap on an inner surface of the target hole.

4 Claims, 9 Drawing Sheets

(51) Int. Cl.
*B24C 9/00* (2006.01)
*C21D 7/06* (2006.01)

(56) References Cited

FOREIGN PATENT DOCUMENTS

| | | | |
|---|---|---|---|
| JP | 2007-054895 | A | 3/2007 |
| JP | 2010-253667 | A | 11/2010 |
| JP | 2020-157470 | A | 10/2020 |
| JP | 6872929 | B | 5/2021 |

OTHER PUBLICATIONS

Extended European Search Report mailed on Sep. 25, 2024 in a corresponding European Patent Application No. 24171675.2 (8 pages).

* cited by examiner

CAVITATION PROCESSING METHOD AND CAVITATION PROCESSING APPARATUS

CROSS-REFERENCE TO RELATED APPLICATIONS

This application claims the benefit of priority to Japanese Patent Application No. 2023-074643, filed on Apr. 28, 2023, the entire contents of which are hereby incorporated by reference.

BACKGROUND

1. Technical Field

The present invention relates to a cavitation processing method and a cavitation processing apparatus for performing a cavitation process on a surface of a workpiece.

2. Description of the Background

Conventionally, a cavitation process is performed on a workpiece made of metal (Japanese Patent No. 6872929). In the cavitation process, a jet of a fluid containing a cavity (bubble) is caused to collide with the workpiece to process the surface of the workpiece by an impact force when the cavity collapses. The cavitation process provides effects such as peening for applying compressive residual stress to the surface of the workpiece, improvement of the slidability by forming a dimple shape on the surface of the workpiece, cleaning, peeling, cutting, and deburring.

BRIEF SUMMARY

The workpieces to be performed on the cavitation process have various shapes and sizes. In order to perform an appropriate cavitation process, it is preferable to cause a jet to collide with the surface of the workpiece by an appropriate method according to the conditions of the workpiece.

An object of the present invention is to provide a cavitation processing method and a cavitation processing apparatus that perform a cavitation process on a surface inside a target hole of a workpiece.

A first aspect of the present invention provides a cavitation processing method, including:

attaching a cap having a through hole to an inlet of a target hole of a workpiece;

immersing the workpiece and a nozzle into a processing liquid; and ejecting a jet of the processing liquid from the nozzle located outside of the target hole to an inside of the target hole through the through hole such that a cavitation process is performed on a processing region that is located downstream of a non-processing region covered by the cap on an inner surface of the target hole.

A second aspect of the present invention provides a cavitation processing apparatus configured to perform a cavitation process on a workpiece having a target hole having an inlet, the cavitation processing apparatus including:

a cap attached to the inlet, the cap including, a head portion having a male thread portion, and a through hole configured to penetrate the head portion and the cover portion;

a nozzle located outside the target hole, the nozzle configured to eject a jet of processing liquid through the through hole to an inside of the target hole; and a tank configured to store the processing liquid for immersing the workpiece with the cap and the nozzle.

During the cavitation process, both the workpiece and the nozzle are immersed in the processing liquid stored in the tank. In the processing liquid, a jet of the processing liquid is ejected from the nozzle toward the workpiece. The processing liquid is, for example, water. The processing liquid may be a mixture of water and an abrasive. The abrasive material may be mixed with the processing liquid stored in the tank.

The workpiece is made of metal. The metal constituting the workpiece is, for example, an aluminum alloy, a magnesium alloy, titanium, a titanium alloy, or steel. The workpiece is, for example, a mechanical part. The mechanical part is, for example, a valve or a pipe joint. The target hole included in the workpiece may be a hole having no branch. The target hole may have a branch. The depth of the target hole is, for example, 50 mm to 300 mm. The target hole has an inner diameter of, for example, 10 mm to 40 mm. The nozzle has a diameter of, for example, 0.5 mm to 3 mm. The ejection pressure of the jet is, for example, 10 MPa to 80 MPa.

The closing body is, for example, a metal. The closing body may be fitted into an opening of the target hole. The closing body may have an external thread and may be screwed into an internal thread formed in the opening of the target hole. The closing body may have a small gap (e.g., 0.5 mm) with respect to the target hole. For example, when the sectional shape of the target hole is circular, the closing body may have a disk shape, a cylindrical column shape, or a cylindrical shape.

The cover body is, for example, a metal. The metal constituting the cover body is, for example, stainless steel. The cover body may be in contact with a non-processing region of the inner surface of the target hole. The cover body may have a slight gap (e.g., 0.5 mm) with respect to the target hole. For example, in a case where the sectional shape of the target hole is circular, the cover body may have a disk shape, a cylindrical column shape, or a cylindrical shape.

The through hole may be a hole that penetrates the cover body in the flow direction of the jet. For example, when the sectional shape of the target hole is circular, the sectional shape of the through hole may be circular, and the center axis of the through hole may coincide with the center axis of the target hole.

The region of the deep portion of the target hole that is the processing region is a region in the vicinity of the position where the target hole is closed. Specifically, it is a region 5 mm to 20 mm to the depth of the target hole from the position where the target hole is closed.

The obstruction body is, for example, a metal. The metal constituting the obstruction body is, for example, stainless steel. The obstruction body may be in contact with the inner surface of the target hole. The obstruction body may be spaced apart from the target hole.

The obstruction body may move from the upstream to the downstream in the flow direction of the jet. The obstruction body may move from the downstream to the upstream in the flow direction of the jet.

The closing body and the cover body may be integrally formed. The closing body may close the opening of the target hole and cover the inner surface of the target hole. When the region covered by the closing body is a non-processing region, the closing body also functions as a cover body. That is, the closing body may also function as the cover body.

The cover body and the obstruction body may be integrally formed. The cover body may cover the inner surface of the target hole and block the flow of the jet. At this time, the cover body also functions as an obstruction body. That is, the cover body may also function as the obstruction body.

The closing body and the obstruction body may be integrally formed. The closing body may close the opening of the target hole and block the flow of the jet. At this time, the closing body also functions as an obstruction body. That is, the closing body may also function as the obstruction body.

The closing body, the cover body, and the obstruction body may be integrally formed. The closing body may close the opening of the target hole, cover the inner surface of the target hole, and block the flow of the jet. At this time, the closing body also functions as a cover body and an obstruction body. That is, the closing body may serve as both the cover body and the obstruction body.

According to the present invention, the cavitation process can be performed on the inner surface of the target hole of the workpiece.

DETAILED DESCRIPTION

First Embodiment

Figure 1:
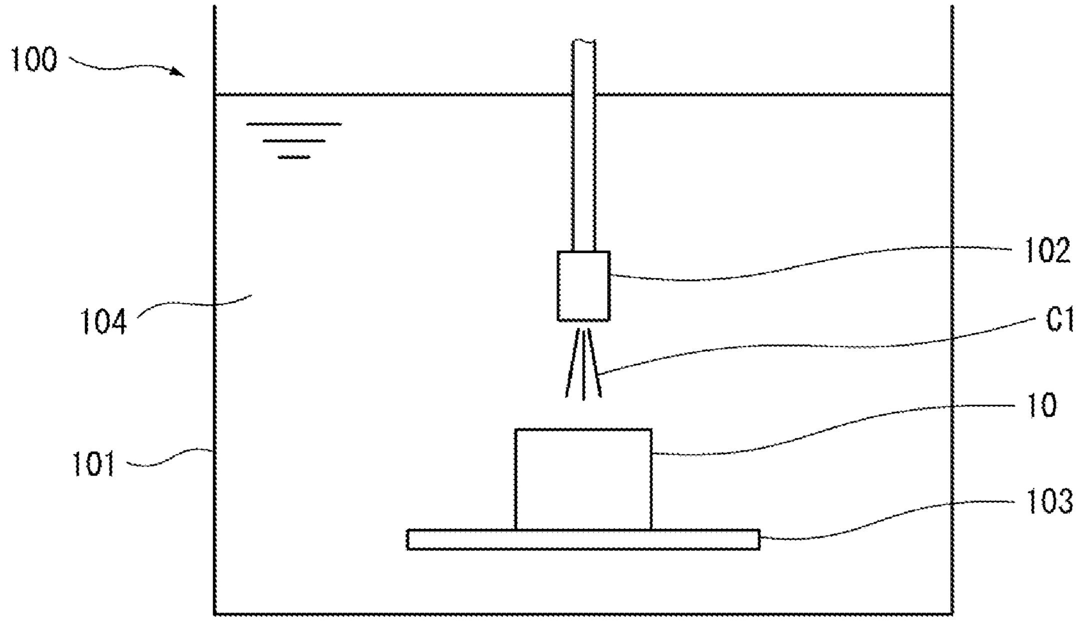
FIG. 1 shows a cavitation processing apparatus according to a first embodiment.

A cavitation processing apparatus used in a cavitation processing method according to a first embodiment will be described. As shown in FIG. 1, a cavitation processing apparatus 100 includes a tank 101, a nozzle 102, and a mounting table 103. The cavitation processing apparatus 100 performs a cavitation process on a workpiece 10.

The tank 101 stores a processing liquid 104. The processing liquid 104 is, for example, water. The tank 101 may include a device for circulating the stored processing liquid 104.

The nozzle 102 ejects a jet C1 of the processing liquid 104 supplied from a high-pressure fluid source (not shown). The jet C1 contains many cavities. The nozzle 102 ejects the jet C1 downward. The direction of ejection may be other than downward. The nozzle 102 is movable in three axial directions in a horizontal direction (front-rear direction and left-right direction) and a vertical direction. The ejection velocity (pressure) of the jet C1 and the three-axis movement of the nozzle 102 are controlled by a control device (not shown). The nozzle 102 has a nozzle diameter (inner diameter) of, for example, 0.5 mm to 3 mm.

The mounting table 103 places and fixes the workpiece 10. The mounting table 103 fixes the workpiece 10 with a fastener such as a bolt, a clamp, or the like, or fixes the workpiece 10 by clamping. The mounting table 103 is movable in the vertical direction. This allows the workpiece 10 to be taken in and out of the tank 101. The vertical movement of the mounting table 103 is controlled by the control device (not shown).

The cavitation processing apparatus 100 configured as described above can eject the jet C1 at any position of the workpiece 10 from any distance.

Figure 2:
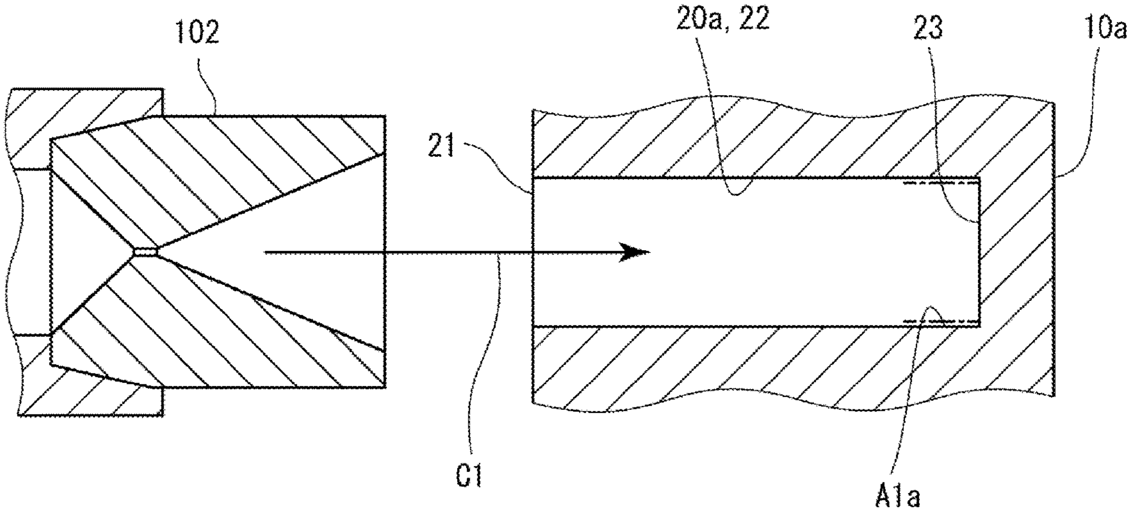
FIG. 2 is a longitudinal sectional view of a workpiece according to the first embodiment.

Next, the cavitation processing method of the present embodiment performed by the cavitation processing apparatus 100 will be described. As shown in FIG. 2, in the cavitation processing method of the present embodiment, a workpiece 10*a* has a single target hole 20*a*.

FIG. 2 is a sectional view taken through a center of the target hole 20*a*. The left side of the drawing is upward, and the right side of the drawing is downward. Hereinafter, the same applies to FIGS. 3A to 9B.

The workpiece 10*a* has the target hole 20*a* with a single inlet 21. The inlet 21 opens to one face of the workpiece 10*a*. The target hole 20*a*, which has a circular cross section, extends linearly from the inlet 21. The target hole 20*a* has a cylindrical side surface 22 and a circular bottom surface 23. The inlet 21 has an inner diameter smaller than an outer diameter of the nozzle 102. The nozzle 102 thus cannot be inserted into the target hole 20*a*. The inner diameter of the target hole 20*a* may be constant or may vary from the inlet 21 toward the bottom.

The target hole 20*a* has a depth of, for example, 50 mm to 100 mm. The inner diameter of the inlet 21 is, for example, 10 mm.

The workpiece 10*a* has a processing region Ala on an inner surface of the target hole 20*a*. The processing region Ala is a region on which the cavitation process is performed. The processing region Ala is arbitrarily set. In the workpiece 10*a*, the side surface 22 in the vicinity of the bottom surface 23, which is indicated by a dashed-dotted line in FIG. 2, is the processing region Ala. The vicinity of the bottom surface 23 is, for example, approximately 10 mm from the bottom surface 23.

The steps of the cavitation processing method of the present embodiment are as follows.

First, the processing liquid 104 is stored in the tank 101 as much as possible to immerse the workpiece 10*a* in a sufficient depth. The sufficient depth is, for example, 300 mm to 500 mm. At this time, the nozzle 102 and the mounting table 103 are positioned above the liquid level of the processing liquid 104.

Next, the workpiece 10*a* is mounted and fixed on the mounting table 103. The workpiece 10*a* is fixed in a position in which the inlet 21 of the target hole 20*a* faces upward.

Next, the mounting table 103 is moved downward to immerse the workpiece 10*a* (mounting table 103) in the processing liquid 104 stored in the tank 101.

Next, the nozzle 102 is moved horizontally so that the nozzle 102 faces the inlet 21 of the target hole 20*a*.

Next, the nozzle 102 is moved downward to immerse the nozzle 102 in the processing liquid 104 stored in the tank 101. The distance between the nozzle 102 and the processing region Ala of the workpiece 10*a* is set to a distance suitable for the cavitation process. The suitable distance for the cavitation process is, for example, a distance of about 50 to 200 times the diameter of the nozzle 102. If the nozzle 102 has an ejection hole diameter of 1 mm, the distance between the nozzle 102 and the processing region Ala of the workpiece 10*a* is preferably 50 mm to 200 mm.

Finally, a high pressure fluid source (not shown) is activated to eject the jet C1 from the nozzle 102. The jet C1 enters the inside of the target hole 20*a* through the inlet 21 to reach the processing region Ala.

The jet C1 performs the cavitation process on the processing region Ala. This provides an effect such as peening in which compressive residual stresses are applied to the processing region Ala. The nozzle 102 does not enter the target hole 20*a*. However, by ejecting the jet C1 from the outside of the target hole 20*a* to the target hole 20*a* which is a closed hole having no opening other than the single inlet 21, the cavitation process can be performed on the processing region Ala on the inner surface of the target hole 20*a*. The processing region Ala is in the vicinity of the bottom surface 23.

The order of the steps of the cavitation processing method of the present embodiment is not limited to the above-described order. For example, the processing liquid 104 may be stored in the tank 101 after the mounting table 103 or the nozzle 102 is moved. The nozzle 102 may be moved in the horizontal direction after being moved in the downward direction, or may be moved simultaneously in the horizontal direction and the downward direction.

When the workpiece 10*a* has a plurality of target holes 20*a*, after the cavitation process for one target hole 20*a* is completed, the nozzle 102 may be moved to perform cavitation process for another target hole 20*a*.

Second Embodiment

The cavitation processing method according to a second embodiment will be described. Also in the present embodiment, the cavitation processing apparatus 100 substantially the same as that of the first embodiment is used.

Figure 3A:
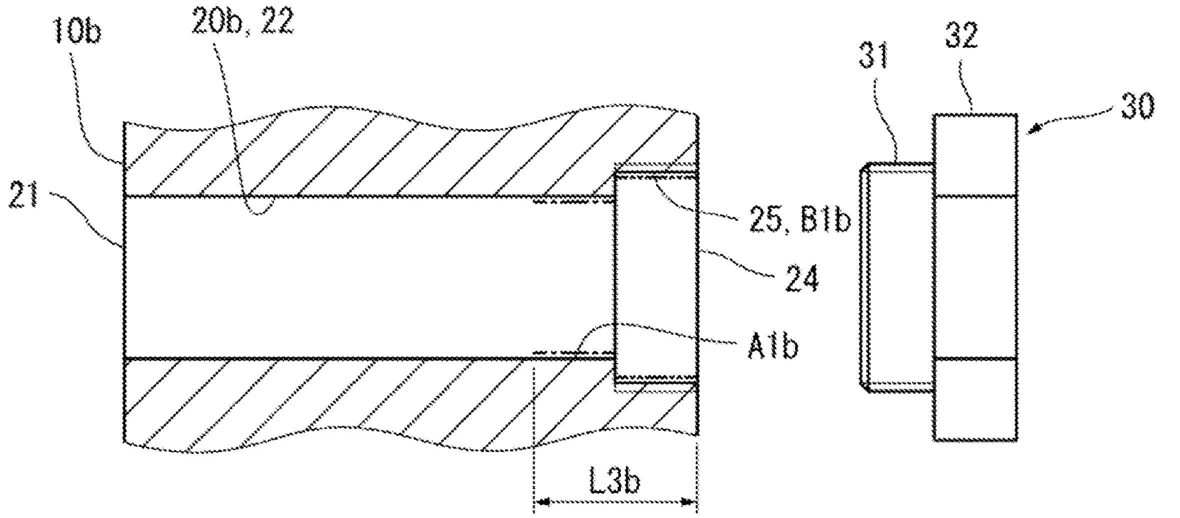
FIG. 3A is a longitudinal sectional view of a workpiece and a first cap according to a second embodiment.

As shown in FIG. 3A, in the cavitation processing method according to the present embodiment, a workpiece 10*b* has a single target hole 20*b*. The target hole 20*b* has a single inlet 21 and a single opening 24. The inlet 21 opens to a first face of the workpiece 10*b*. The opening 24 opens to a second face of the workpiece 10*b*. That is, the target hole 20*b* penetrates from the first face to the second face of the workpiece 10*b*. The target hole 20*b*, which has a circular cross-section, extends linearly from the inlet 21 to the opening 24. The target hole 20*b* has a cylindrical side surface 22. A female thread portion 25 is formed in the opening 24. The inlet 21 has an inner diameter smaller than the outer diameter of the nozzle 102 (not shown in FIG. 3A and thereafter). The nozzle 102 thus cannot be inserted into the target hole 20*b*. The inner diameter of the target hole 20*b* may be constant or may vary from the inlet 21 toward the opening 24.

The workpiece 10*b* has a non-processing region B1*b* on an inner surface of the target hole 20*b*. The non-processing region B1*b* is a region on which the cavitation process is not performed. The non-processing region B1*b* is arbitrarily set. In the workpiece 10*b*, a female thread portion 25 indicated by a two-dot chain line in FIG. 3A is the non-processing region B1*b*. This is because, when the cavitation process is performed on the female thread portion 25, the thread may be deformed and the performance as a screw may be impaired.

The workpiece 10*b* has a processing region Alb on the inner surface of the target hole 20*b*. In the workpiece 10*b*, a predetermined region of the side surface 22, which is indicated by a dashed-dotted line in FIG. 3A in the vicinity of the female thread portion 25, is the processing region Alb. The predetermined region is, for example, approximately 5 mm to 10 mm from the female thread portion 25.

Figure 3B:
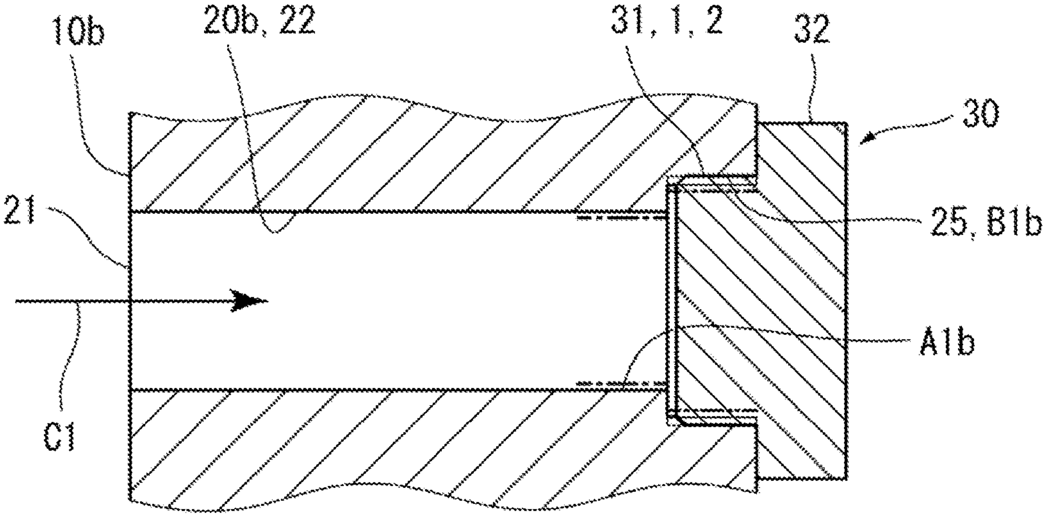
FIG. 3B shows the workpiece with the first cap according to the second embodiment attached.

As shown in FIGS. 3A and 3B, in the cavitation process of the present embodiment, a first cap 30 is attached to the opening 24 of the workpiece 10*b* in advance. The first cap 30, which has a bolt shape, includes a male thread portion (closing body, cover body) 31 and a head portion 32. The male thread portion 31 of the first cap 30 is screwed into the female thread portion 25 of the workpiece 10*b*. The opening 24 is then closed by the male thread portion 31, and the non-processing region B1*b* (female thread portion 25) is covered by the male thread portion 31. That is, the male thread portion 31 functions as not only a closing body 1 that closes the opening 24 but also a cover body 2 that covers the non-processing region B1*b*. In this manner, the cavitation process is performed on the workpiece 10*b* with the first cap 30 attached.

The step of the cavitation processing method of the present embodiment is substantially the same as the step of the cavitation processing method of the first embodiment, except that the first cap 30 is firstly attached to the workpiece 10*b*.

By the jet C1, the cavitation process is performed on the processing region Alb. By attaching the first cap 30 to the opening 24, the closing body 1 (the male thread portion 31) closes the opening 24, and the target hole 20*b* becomes a closed hole. By ejecting the jet C1 into the target hole 20*b* from the outside of the target hole 20*b*, the cavitation process is performed on the inner surface of the target hole 20*b*. The processing region Alb is in the vicinity of the closing body 1 (the male thread portion 31). The closing body 1 is a deep portion in which the target hole 20*b* is closed. As the non-processing region B1*b* is covered by the cover body 2 (the male thread portion 31), the jet C1 does not contact the non-processing region B1*b*. The cavitation process is thus not performed on the non-processing region B1*b*.

Third Embodiment

The cavitation processing method according to a third embodiment will be described. Also in the present embodiment, the cavitation processing apparatus 100 substantially the same as that of the first embodiment is used.

Figure 4A:
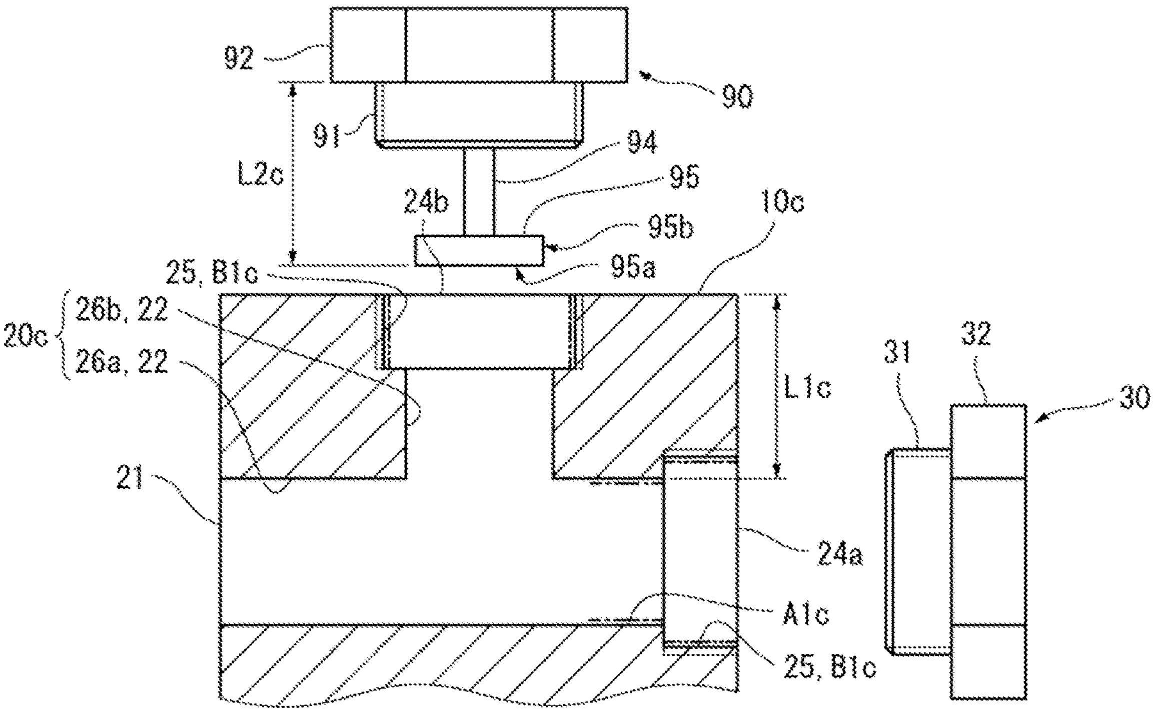
FIG. 4A is a longitudinal sectional view of a workpiece, the first cap, and a seventh cap according to a third embodiment.

As shown in FIG. 4A, in the cavitation-processing method of the present embodiment, a workpiece 10*c* has a single target hole 20*c*. The target hole 20*c* has a single inlet 21 and two openings (a first opening 24*a* and a second opening 24*b*). The inlet 21 opens to a first face of the workpiece 10*c*. The first opening 24*a* opens to a second face of the workpiece 10*c*. The second opening 24*b* opens to a third face of the workpiece 10*c*. That is, the target hole 20*c* branches from the first face of the workpiece 10*c* and passes through the second face and the third face. The target hole 20*c*, which has a circular cross section, has a main flow path 26*a* and a branch flow path 26*b*. The main flow path 26*a* extends linearly from the inlet 21 to the first opening 24*a*. The branch flow path 26*b* branches from an intermediate portion of the main flow path 26*a* and extends linearly to the second opening 24*b*. That is, the target hole 20*c* has a T-shaped flow path. The target hole 20*c* is formed by combining two cylindrical surfaces 22. A female thread portion 25 is formed in the first opening 24*a* and the second opening 24*b*. The inlet 21 has an inner diameter smaller than an outer diameter of the nozzle 102. The nozzle 102 thus cannot be inserted into the target hole 20*c*. The inner diameter of the target hole 20*c* may be constant or vary from the inlet 21 toward the first opening 24*a* or the second opening 24*b*.

The workpiece 10*c* has a non-processing region B1*c* on an inner surface of the target hole 20*c*. In the workpiece 10*c*, the two female thread portions 25 indicated by the two-dot chain lines in FIG. 4A are the non-processing regions B1*c*.

The workpiece 10*c* has a processing region A1*c* on an inner surface of the target hole 20*c*. In the workpiece 10*c*, a predetermined region of the side surface 22, which is indicated by a dashed-dotted line in FIG. 4A and adjacent to the female thread portion 25 formed in the first opening 24*a*, is the processing region A1*c*. The processing region A1*c* is within a 5 mm to 10 mm range along the depth of the main flow path 26*a* of the target hole 20*c*.

Figure 4B:
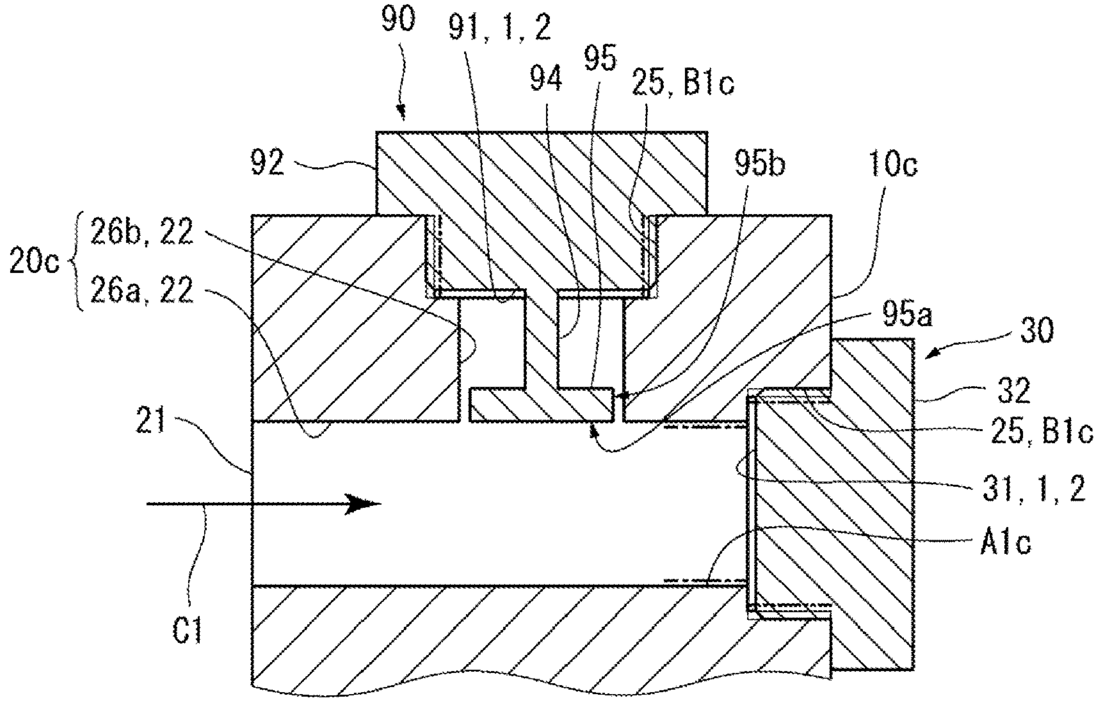
FIG. 4B shows the workpiece with the first cap and the seventh cap according to the third embodiment attached.

As shown in FIGS. 4A and 4B, in the cavitation processing method of the present embodiment, a first cap 30 is attached to the first opening 24*a* and a seventh cap 90 is attached to the second opening 24*b* in advance. The seventh cap 90 includes a male thread portion (closing body, cover body) 91, a head portion 92, a support portion 94, and an obstruction portion 95. The male thread portion 91 and the head portion 92 are substantially the same as the male thread portion 31 and the head portion 32 of the first cap 30. The support portion 94, which is rod-shaped, extends from a distal end of the male thread portion 91 along the direction in which the branch flow path 26*b* extends. The obstruction portion 95, which has a disk shape, is disposed at a distal end of the support portion 94. The obstruction portion 95 has a distal end surface 95*a* and a lateral peripheral surface 95*b*. The obstruction portion 95 has an outer diameter slightly smaller than an inner diameter of the branch flow path 26*b*. A sealing member may be provided on the lateral peripheral surface 95*b* to close a gap between the obstruction portion 95 and the branch flow path 26*b*. The distal end surface 95*a* is an end surface of the obstruction portion 95 on the main flow path 26*a* side. The distal end surface 95*a* is a flat surface. A height L2*c* from the distal end surface 95*a* to the head portion 92 is substantially equal to a distance L1*c* from the second opening 24*b* to the side surface 22 of the main flow path 26*a*. The distal end surface 95*a* may be a curved surface. The support portion 94, the obstruction portion 95, and the male thread portion 91 may be integrated with each other. A center axis of the support portion 94 coincides with a center axis of the obstruction portion 95 and a center axis of the male thread portion 91.

As shown in FIG. 4B, the male thread portion 91 of the seventh cap 90 is screwed into the female thread portion 25 of the second opening 24*b*. The second opening 24*b* is then closed by the male thread portion 91, and the non-processing region B1*c* (female thread portion 25) is covered by the male thread portion 91. Further, the obstruction portion 95 is located at an end portion of the branch flow path 26*b* on the main flow path 26*a* side. When viewed from the main flow path 26*a*, the inlet of the branch flow path 26*b* is blocked by the obstruction portion 95. Preferably, when the seventh cap 90 is attached to the workpiece 10*c*, the distal end surface 95*a* is smoothly connected to the side surface 22 of the main flow path 26*a*. That is, the male thread portion 91 functions as the closing body 1 that closes the second opening 24*b*, and functions as the cover body 2 that covers the non-processing region B1*c*. In this way, the cavitation process is performed on the workpiece 10*c* to which the first cap 30 and the seventh cap 90 are attached.

The step of the cavitation processing method of the present embodiment is substantially the same as the step of the cavitation processing method of the first embodiment except that the first cap 30 is first attached to the first opening 24*a* and the seventh cap 90 is attached to the second opening 24*b*.

By the jet C1, the cavitation process is performed on the processing region A1*c*. By attaching the first cap 30 to the first opening 24 and attaching the seventh cap 90 to the second opening 24*b*, the closing body 1 (male thread portions 31, 91) closes the first opening 24*a* and the second opening 24*b*, and further, the obstruction portion 95 closes the inlet of the branch flow path 26*b*. The target hole 20*c* is then substantially a closed hole having no branch. That is, the target hole 20*c* is substantially the same as the target hole 20*b* of the second embodiment. The cavitation process is performed on the processing region A1*c* of an inner surface of the target hole 20*c* by ejecting the jet C1 to the target hole 20*c* from the outside of the target hole 20*c* which is a closed hole. The processing region A1*c* is in the vicinity of the closing body 1 (the male thread portion 31) of the first cap 30. The closing body 1 is a bottom portion of the closed target hole 20*c*. As the non-processing region B1*c* is covered by the cover body 2 (the male thread portions 31, 91), the jet C1 does not contact the non-processing region B1*c*. The cavitation process is thus not performed on the non-processing region B1*c*.

Fourth Embodiment

The cavitation processing method of a fourth embodiment will be described. Also in the present embodiment, the cavitation processing apparatus 100 substantially the same as that of the first embodiment is used.

Figure 5A:
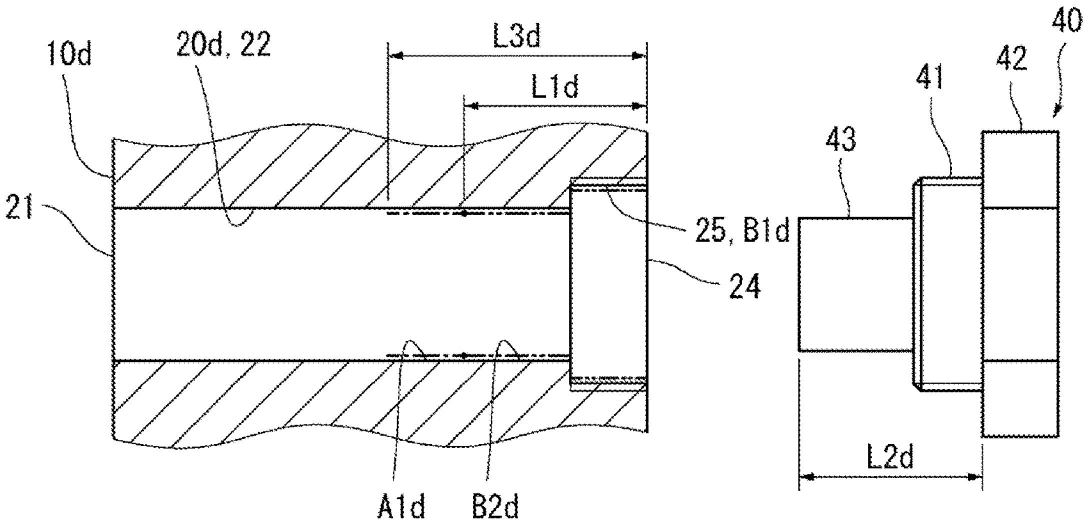
FIG. 5A is a longitudinal sectional view of a workpiece and a second cap according to a fourth embodiment.

As shown in FIG. 5A, in the cavitation-processing method of the present embodiment, a workpiece 10*d* has a single target hole 20*d*. The target hole 20*d* is substantially the same as the target hole 20*b* of the second embodiment.

The workpiece 10*d* has a non-processing regions B1*d*, B2*d* on an inner surface of the target hole 20*d*. In the workpiece 10*d*, the female thread portion 25 indicated by a two-dot chain line in FIG. 5A on the side surface 22 is the non-processing region B1*d*, and a predetermined region adjacent to the female thread portion 25 is the non-processing region B2*d*. Here, the non-processing region B2*d* is a region where tolerances are specified for the inner diameter. This is because if the cavitation process is performed on a region where the tolerance is specified, there is a possibility that the accuracy of the dimension cannot be maintained.

The target hole 20*d* has a processing region A1*d* on the inner surface. In the workpiece 10*d*, a predetermined region of the side surface 22, which is indicated by a dashed-dotted line in FIG. 5A and adjacent to the non-processing region B2*d*, is the processing region A1*d*. The predetermined region is, for example, in a range of about 5 mm to 10 mm from the non-processing region B2*d*. A height L3*d* is defined as a distance from the opening 24 to the front end (the end toward the inlet 21) of the processing region A1*d*. Hereinafter, the direction toward the inlet 21 is referred to as a distal direction. In addition, with respect to the target holes 20*a* to 20*g* (described later), the height refers to the distance from the opening 24. In addition, with respect to the caps 30, 40, 50, and 60 and the movable plates 75 and 85 (described later), the height refers to a distance from the head to the tip (not including the head itself).

Figure 5B:
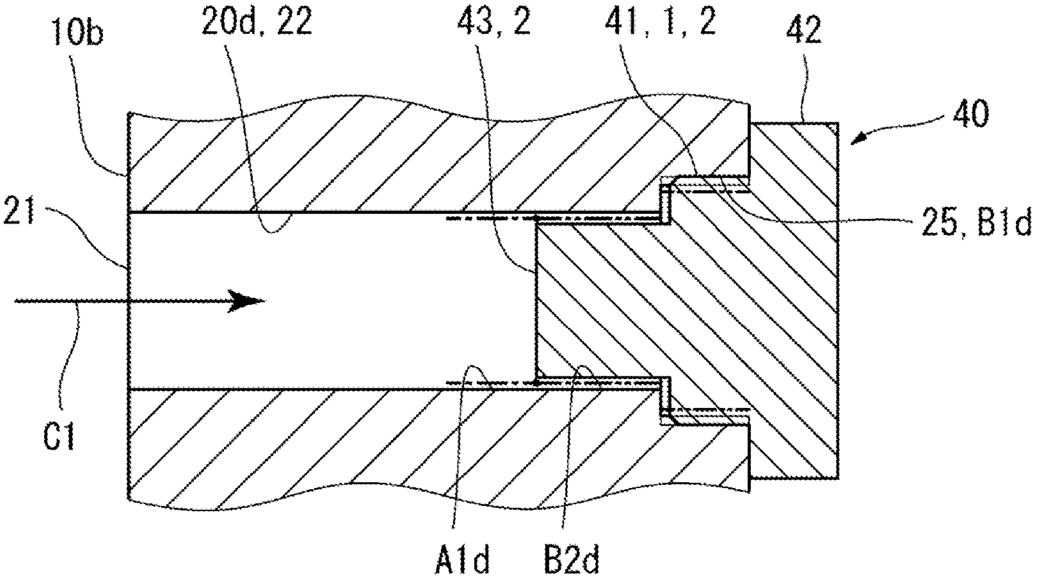
FIG. 5B shows the workpiece with the second cap according to the fourth embodiment attached.

As shown in FIGS. 5A and 5B, in the cavitation processing method of the present embodiment, the second cap 40 is attached to the opening 24 in advance. The second cap 40 includes a male thread portion (closing body, cover body) 41, a head portion 42, and a cover portion (cover body) 43. The male thread portion 41 and the head portion 42 are substantially the same as the male thread portion 31 and the head portion 32 of the first cap 30. The cover portion 43, which has a cylindrical shape, is located at the distal end of the male thread portion 41. The cover portion 43 may be integrated with the male thread portion 41. The center axis of the cover portion 43 and the center axis of the male thread portion 41 coincide with each other. The cover portion 43 has an outer diameter slightly smaller than the inner diameter of the target hole 20*d*. The height L2*d* of the cover portion 43 is substantially equal to the height L1*d* of the non-processing region B2*d* from the opening 24. A sealing member may be provided on the peripheral surface of the cover portion 43 to close a gap between the cover portion 43 and the target hole 20*d*. When the male thread portion 41 of the second cap 40 is screwed into the female thread portion 25 of the workpiece 10*d*, the opening 24 is closed by the male thread portion 41, and the non-processing region B1*d* (female thread portion 25) is covered by the male thread portion 41. The peripheral surface of the cover portion 43 faces the non-processing region B2*d* with a slight gap therebetween. Thus, the cover portion 43 substantially covers the non-processing region B2*d* (region adjacent to the female thread portion 25). That is, the male thread portion 41 functions as the closing body 1 that closes the opening 24, and functions as the cover body 2 that covers the non-processing region B1*d*. The cover portion 43 functions as the cover body 2 that covers the non-processing region B2*d*. Note that the cover portion 43 and the non-processing region B2*d* may be in contact with each other. In this way, the cavitation processing method is performed on the workpiece 10*d* with the second cap 40.

The step of the cavitation processing method of the present embodiment is substantially the same as the step of the cavitation processing method of the first embodiment, except that the second cap 40 is firstly attached to the workpiece 10*d*.

By the jet C1, the cavitation process is performed on the processing region A1*d*. By attaching the second cap 40 to the opening 24, the closing body 1 (the male thread portion 41) closes the opening 24, and the target hole 20*d* becomes a closed hole. By ejecting the jet C1 into the target hole 20*d* from the outside of the target hole 20*d*, the cavitation process can be performed on the processing region A1*d*. The processing region A1*d* is in the vicinity of the cover body 2 (cover portion 43). The cover body 2 is a deep portion in which the target hole 20*d* is closed. As the non-processing regions B1*d*, B2*d* are covered by the cover body 2 (the male thread portion 41 and the cover portion 43), the jet C1 is not contacted. The cavitation process is thus not performed on the non-processing region B1*d*, B2*d*.

Note that, after the cavitation process of the second embodiment is performed on the workpiece 10*b* of the second embodiment, the cavitation process of the present embodiment may be performed by attaching the second cap 40 of the present embodiment instead of the first cap 30. For example, if the height L2*d* of the cover portion 43 is made to coincide with the height L3*b* of the processing region Alb of the second embodiment, the cavitation process can be performed on successively long regions. The workpiece 10*c* of the third embodiment is also substantially the same.

Fifth Embodiment

The cavitation processing method of a fifth embodiment will be described. Also in the present embodiment, the cavitation processing apparatus 100 substantially the same as that of the first embodiment is used.

Figure 6A:
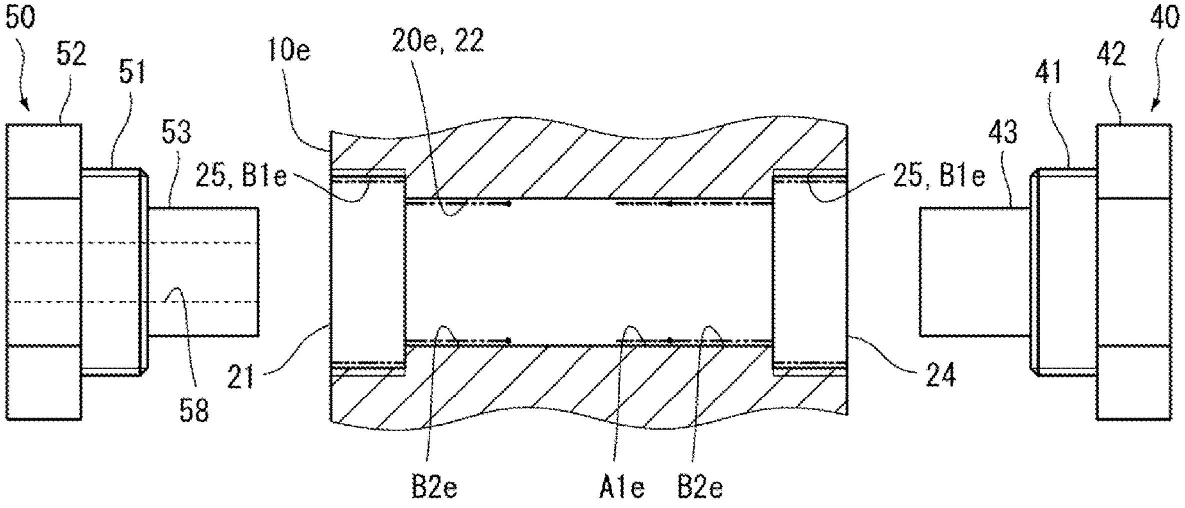
FIG. 6A is a longitudinal sectional view of a workpiece, the second cap, and a third cap according to a fifth embodiment.

As shown in FIG. 6A, in the cavitation-processing method of the present embodiment, a workpiece 10*e* has a single target hole 20*e*. The target hole 20*e* is substantially the same as the target hole 20*b* of the second embodiment except that the female thread portion 25 is formed at the inlet 21 of the target hole 20*e*.

The workpiece 10*e* has non-processing regions B1*e*, B2*e* on an inner surface of the target hole 20*e*. In the workpiece 10*e*, as indicated by a two-dot chain line in FIG. 6A, both of the female thread portions 25 on the side surface 22 are the non-processing regions B1*e*. In addition, predetermined regions adjacent to both of the female thread portions 25 are the non-processing regions B2*e*. Here, the non-processing region B2*e* is a region where tolerances are specified for the inner diameter.

The target hole 20*e* has a processing region Ale on the inner surface. In the workpiece 10*e*, a predetermined region on the side surface 22, which is indicated by a dashed-dotted line in FIG. 6A and adjacent to the non-processing region B2*e* on the opening 24 side, is the processing region Ale. Here, the depth of the target hole 20*e* in the processing region Ale is 5 mm to 20 mm.

Figure 6B:
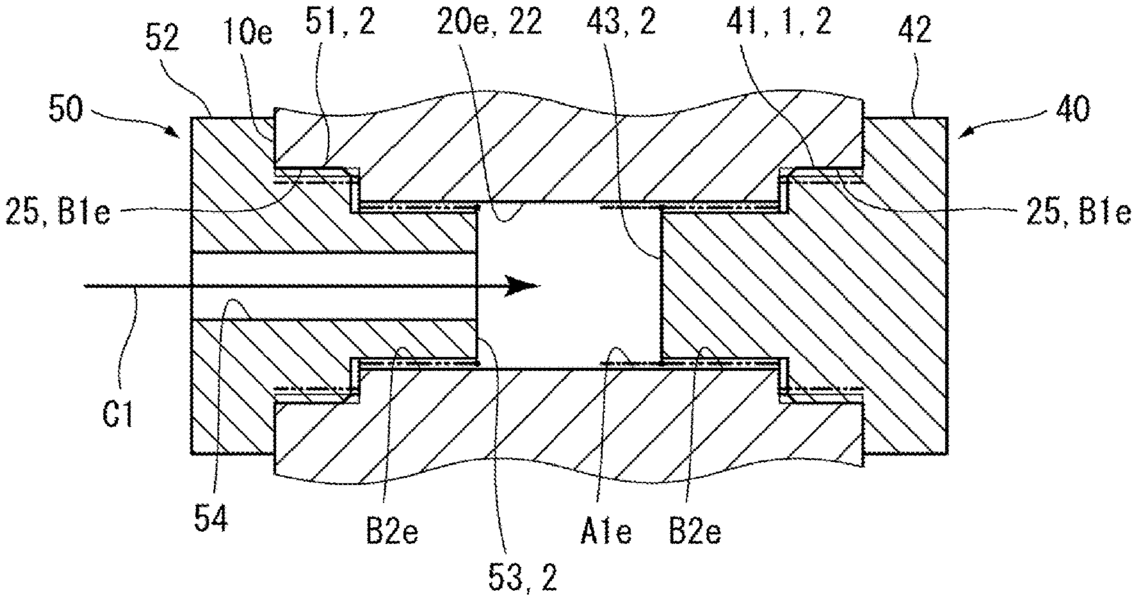
FIG. 6B shows the workpiece with the second cap and the third cap according to the fifth embodiment attached.

As shown in FIGS. 6A and 6B, in the cavitation processing method of the present embodiment, the second cap 40 is attached to the opening 24 of the workpiece 10*e* in advance. A third cap 50 is attached to the inlet of the workpiece 10*e*. The third cap 50 includes a male thread portion (cover body) 51, a head portion 52, and a cover portion (cover body) 53. The male thread portion 51, the head portion 52, and the cover portion 53 are substantially the same as the male thread portion 41, the head portion 42, and the cover portion 43 of the second cap 40. A through hole 58 is formed in the third cap 50. The through hole 58 penetrates from the head portion 52 to the cover portion 53. The through hole 58, which has a circular cross section, extends linearly. The center axis of the through hole 58 coincides with the center axis of the male thread portion 51, the head portion 52, and the cover portion 53. The inner diameter of the through hole 58 is, for example, 5 mm to 20 mm. Preferably, the inner diameter of the through hole 58 is 3 mm to 10 mm smaller than the outer diameter of the cover portion 53. When the male thread portion 51 of the third cap 50 is screwed into the female thread portion 25 of the inlet 21 of the workpiece 10*e*, the non-processing region B1*e* (female thread portion 25) is covered by the male thread portion 51. Further, the peripheral surface of the cover portion 53 faces the non-processing region B2*e* with a slight gap therebetween. That is, the cover portion 53 substantially covers the non-processing region B2*e* adjacent to the female thread portion 25. That is, the male thread portion 51 functions as the cover body 2 that covers the non-processing region B1*e*. The cover portion 53 functions as the cover body 2 that covers the non-processing region B2*e*. Note that the cover portion 53 and the non-processing region B2*e* may be in contact with each other. Due to the through hole 58, the third cap 50 does not block the inlet 21. In this way, the cavitation process is performed on the workpiece 10*e* with the second cap 40 and the third cap 50.

The cavitation processing method of the present embodiment is substantially the same as the step of the cavitation processing method of the first embodiment except that the second cap 40 and the third cap 50 are firstly attached to the workpiece 10*e*. However, the jet C1 ejected from the nozzle 102 passes through the through hole 58 of the third cap 50, enters the target hole 20*e*, and reaches the processing region Ale.

By the jet C1, the cavitation process is performed on the processing region Ale. By attaching the second cap 40 to the opening 24, the closing body 1 (the male thread portion 41) closes the opening 24. As a result, the target hole 20*e* becomes a closed hole. By ejecting the jet C1 into the target hole 20*e* from the outside of the target hole 20*e*, the cavitation process can be performed on the inner surface of the target hole 20*e*. The processing region Ale is in the vicinity of the cover body 2 (cover portion 43) of the second cap 40. The cover body 2 is a deep portion in which the target hole 20*e* is closed. As the non-processing regions B1*e*, B2*e* are covered by the cover body 2 (the male thread portions 41, 51 and the cover portions 43, 53), the jet C1 is not contacted. The cavitation process is not thus performed on the non-processing regions B1*e*, B2*e*.

Sixth Embodiment

The cavitation processing method of a sixth embodiment will be described. Also in the present embodiment, the cavitation processing apparatus 100 substantially the same as that of the first embodiment is used.

Figure 7A:
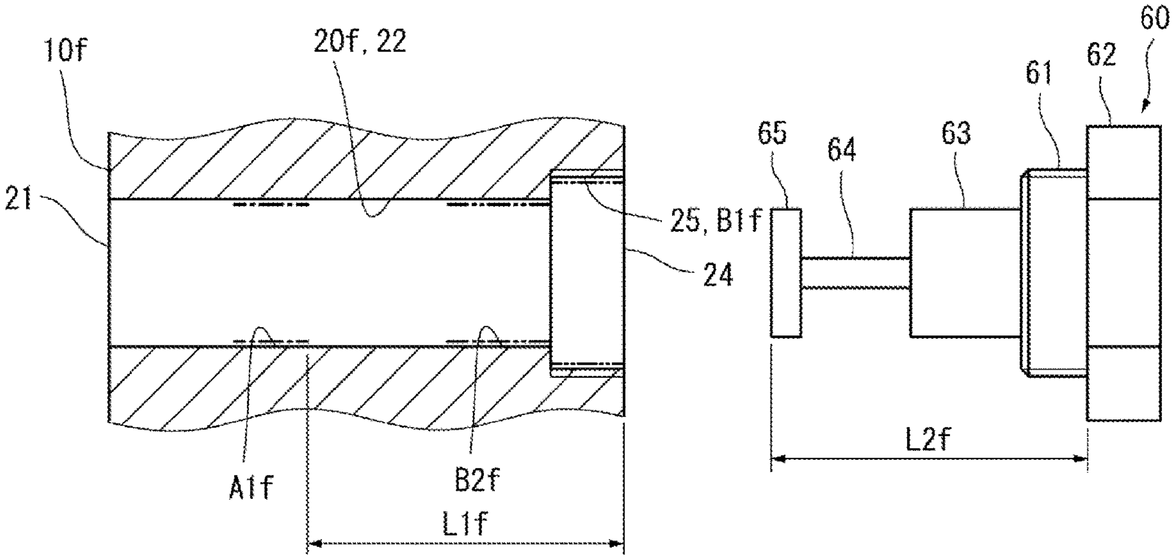
FIG. 7A is a longitudinal sectional view of a workpiece and a fourth cap according to a sixth embodiment.

As shown in FIG. 7A, in the cavitation-processing method of the present embodiment, a workpiece 10*f* has a single target hole 20*f*. The target hole 20*f* is substantially the same as the target hole 20*b* of the second embodiment.

The target hole 20*f* has non-processing regions B1*f*, B2*f* on the inner surface. In the workpiece 10*f*, as indicated by the two-dot chain line in FIG. 7A, the female thread portion 25 on the side surface 22 is the non-processing region B1*f*, and a predetermined region adjacent to the female thread portion 25 is the non-processing region B2*f*. Here, the non-processing region B2*f* is a region where tolerances are specified for the inner diameter.

The target hole 20*f* has a processing region Alf on the inner surface. In the workpiece 10*f*, a predetermined region on the side surface 22, which is a position separated from the non-processing region B2*f* toward the inlet 21 and is indicated by a dashed-dotted line in FIG. 7A, is the processing region A1*f*. The height L1*f* to the base end of the processing region Alf is, for example, 50 mm to 70 mm. The width of the processing region Alf is, for example, about 10 mm.

Figure 7B:
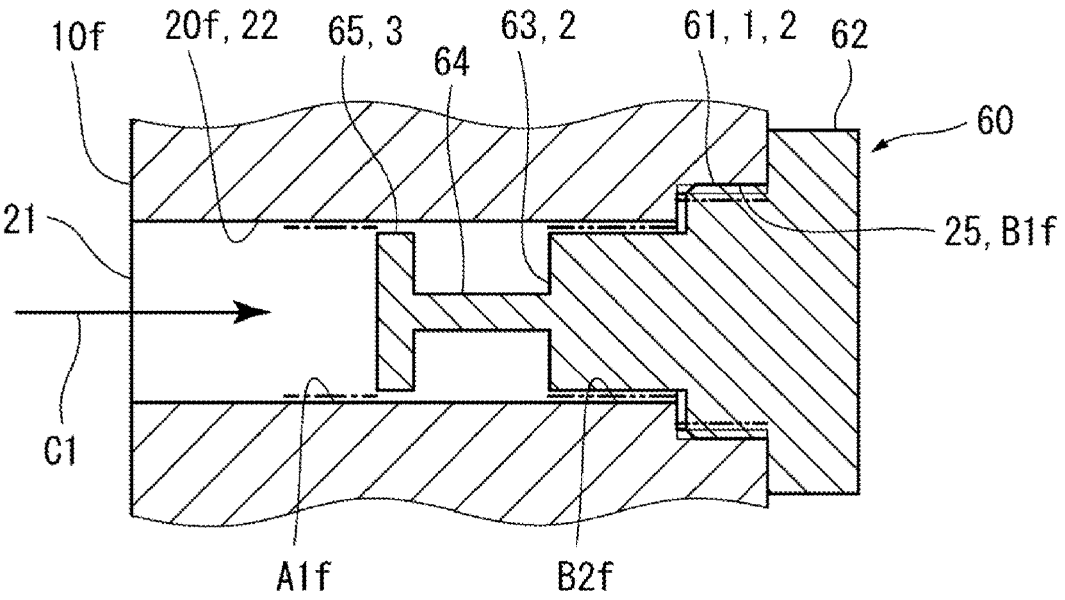
FIG. 7B shows the workpiece with the fourth cap according to the sixth embodiment attached.

As shown in FIGS. 7A and 7B, in the cavitation processing method of the present embodiment, a fourth cap 60 is attached to the opening 24 of the workpiece 10*f* in advance. The fourth cap 60 includes a male thread portion (closing body, cover body) 61, a head portion 62, a cover portion (cover body) 63, a support portion 64, and an obstruction portion (obstruction body) 65. The male thread portion 61, the head portion 62, and the cover portion 63 are substantially the same as the male thread portion 41, the head portion 42, and the cover portion 43 of the second cap 40. The support portion 64 and the obstruction portion 65 are substantially the same as the support portion 94 and the obstruction portion 95 of the seventh cap 90. However, the height L2*f* of the obstruction portion 65 is substantially the same as the height L1*f*. The support portion 64 extends from a distal end of the cover portion 63 in a direction in which the target hole 20*f* extends.

When the male thread portion 61 of the fourth cap 60 is screwed into the female thread portion 25 of the workpiece 10*f*, the opening 24 is closed by the male thread portion 61, and the non-processing region B1*f* (female thread portion 25) is covered by the male thread portion 61. The peripheral surface of the cover body 63 faces the non-processing region B2*f* with a slight gap therebetween. That is, the cover portion 63 substantially covers the non-processing region B2*f* adjacent to the female thread portion 25. In addition, the obstruction portion 65 is located adjacent to the processing region Alf and opposite side from the inlet 21. That is, the male thread portion 61 functions as the closing body 1 that closes the opening 24, and functions as the cover body 2 that covers the non-processing region B1*f*. The cover portion 63 functions as the cover body 2 that covers the non-processing region B2*f*. The obstruction portion 65 functions as the obstruction body 3 that obstructs the flow of the jet C1. Note that the cover portion 63 and the non-processing region B2*f* may be in contact with each other. The cover portion 63 may be omitted, and the support portion 64 may be disposed at the distal end of the male thread portion 61. Even in the absence of the cover portion 63, the jet C1 does not contact the non-processing region B2*f* due to the obstruction portion 65. In this case, the obstruction portion 65 functions as the cover body 2. In this manner, the cavitation process is performed on the workpiece 10*f* with the fourth cap 60.

The step of the cavitation processing method of the present embodiment is substantially the same as the step of the cavitation processing method of the first embodiment, except that the fourth cap 60 is firstly attached to the workpiece 10*f*.

By the jet C1, the cavitation process is performed on the processing region A1*f*. By attaching the fourth cap 60 to the opening 24, the closing body 1 (the male thread portion 61) closes the opening 24, and the target hole 20*f* becomes a closed hole. By ejecting the jet C1 into the target hole 20*f* from the outside of the target hole 20*f*, the cavitation process can be performed on the inner surface of the target hole 20*f*. As the flow of the jet C1 is obstructed by the obstruction body 3 (the obstruction portion 65), the cavitation process is performed on the processing region Alf on the inlet 21 side of the obstruction body 3. The processing region Alf is in the vicinity of the obstruction body 3. The obstruction body 3 is a deep portion in which the target hole 20*f* is blocked. As the non-processing regions B1*f*, B2*f* are covered with the cover body 2 (the male thread portion 61 and the cover portion 63), the jet C1 is not contacted. The cavitation process is thus not performed on the non-processing region B1*f*, B2*f*.

Note that, after the cavitation process of the fourth embodiment is performed on the workpiece 10*d* of the fourth embodiment, the cavitation process of the present embodiment may be performed by attaching the fourth cap 60 of the present embodiment instead of the second cap 40. For example, if the height L2*f* of the obstruction portion 65 of the fourth cap 60 matches the height L3*d* of the processing region A1*d*, the cavitation process can be performed continuously over a long region. The workpiece 10*c* and the workpiece 10*e* are also substantially the same.

In addition, after the cavitation process of the second embodiment is performed on the workpiece 10*b* of the second embodiment, the cavitation process of the present embodiment may be performed by attaching the fourth cap 60 of the present embodiment instead of the first cap 30. For example, if the height L2*f* of the obstruction portion 65 of the fourth cap 60 is set to be higher than the height L3*b* of the processing region Alb, the cavitation process can be performed on two regions separated from each other.

When applied to the workpiece 10*c* of the third embodiment, the vicinity of the intersection of the main flow path 26*a* and the branch flow path 26*b* can be a processing region A1*f*.

Seventh Embodiment

The cavitation processing method of a seventh embodiment will be described. Also in the present embodiment, the cavitation processing apparatus 100 substantially the same as that of the first embodiment is used.

Figure 8A:
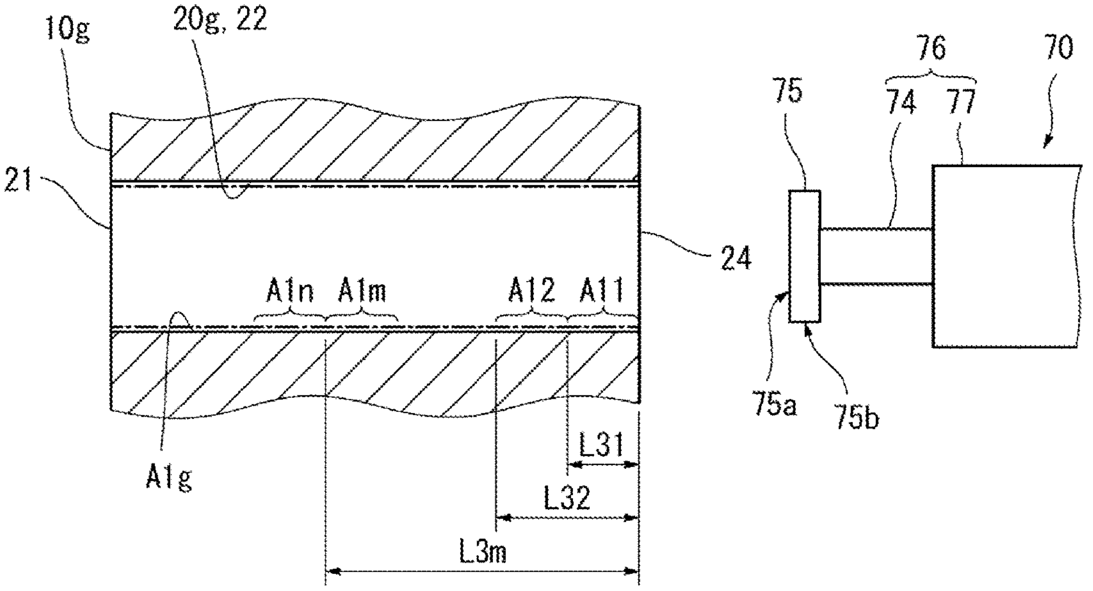
FIG. 8A is a longitudinal sectional view of a workpiece and a fifth cap according to a seventh embodiment.

As shown in FIG. 8A, in the cavitation-processing method of the present embodiment, a workpiece 10*g* has a single target hole 20*g*. The target hole 20*g* has a single inlet 21 and a single opening 24. The inlet 21 opens to a first surface of the workpiece 10*g*. The opening 24 opens to a second surface of the workpiece 10*g*. That is, the target hole 20*g* penetrates from the first surface to the second surface of the workpiece 10*g*. The target hole 20*g*, which has a circular cross-section, extends linearly from the inlet 21 to the opening 24. The target hole 20*g* has a cylindrical side surface 22. The inlet 21 has an inner diameter smaller than the outer diameter of the nozzle 102. The nozzle 102 thus cannot be inserted into the target hole 20*g*.

The workpiece 10*g* has a processing region A1*g* on the inner surface of the target hole 20*g*. In the workpiece 10*g*, as indicated by the dashed-dotted line in FIG. 8A, the entire side surface 22 becomes the processing region A1*g*.

Figure 8B:
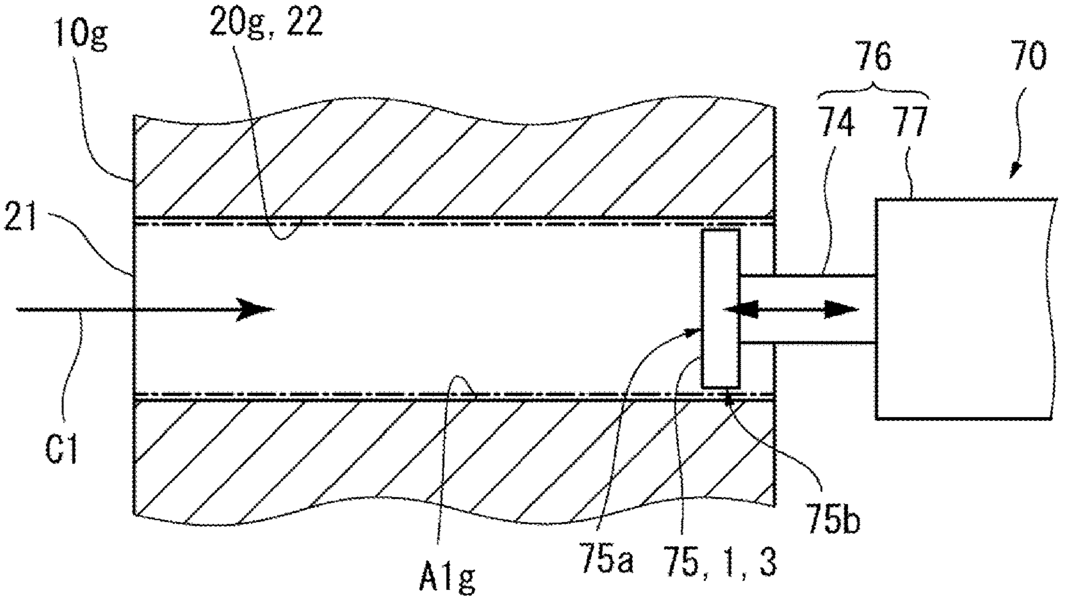
FIG. 8B shows the workpiece with the fifth cap according to the seventh embodiment attached.

As shown in FIGS. 8A and 8B, in the cavitation-processing method of the present embodiment, a fifth cap 70 is attached to the opening 24 of the workpiece 10*g*. The fifth cap 70 includes a movable plate 75 and a drive device 76. The movable plate (closing body, obstruction body) 75 has a disk shape. The movable plate 75 has a distal end surface 75*a* and a side peripheral surface 75*b*. The movable plate 75 has an outer diameter slightly smaller than the inner diameter of the target hole 20*g*. A sealing member may be provided on the side peripheral surface 75*b* to close a gap between the movable plate 75 and the target hole 20*g*. The drive device 76 moves the movable plate 75 along the flow direction of the jet C1 (the center axial direction of the target hole 20*g*). The drive device 76 is a fluid cylinder device. The fluid cylinder is, for example, an air cylinder or a hydraulic cylinder. The drive device 76 includes a cylinder body 77 and a rod 74. The cylinder body 77 has a cylindrical shape. The rod 74, which has a rod shape, moves forward and backward with respect to the cylinder body 77. The distal end of the rod 74 is connected to the movable plate 75. The operation of the drive device 76 is controlled by a control device (not shown).

The drive device 76 positions the movable plate 75 in the opening 24 to be inserted into the target hole 20*g*. The opening 24 is thus closed by the movable plate 75. There is a slight gap between the side peripheral surface 75*b* of the movable plate 75 and the side surface 22 of the target hole 20*g*, but such a state is also included as a closed state. That is, the target hole 20*g* is substantially closed by the movable plate 75. The movable plate 75 is located adjacent to the processing region A1*g* and opposite from the inlet 21. That is, the movable plate 75 functions as the closing body 1 that closes the opening 24, and functions as the obstruction body 3 that obstructs the flow of the jet C1. In this manner, the cavitation process is performed on the workpiece 10*g* with the fifth cap 70.

The step of the cavitation processing method of the present embodiment is substantially the same as the step of the cavitation processing method of the first embodiment except that the fifth cap 70 is firstly attached to the workpiece 10*g* and the movable plate 75 is moved by the drive device 76.

First, the drive device 76 positions the movable plate 75 at the end portion of the opening 24. The nozzle 102 then ejects the jet C1. At this time, the flow of the jet C1 is obstructed by the obstruction body 3 (the movable plate 75). Then, the cavitation process is performed on the region A11 in the vicinity of the obstruction body 3 on the side of the inlet 21. The region A11 is in the vicinity of the obstruction body 3. The height of the region A11 is referred to as L31.

Then, the drive device 76 moves the movable plate 75 so that the distal end surface 75*a* is positioned at the height L31. Then, the cavitation process is performed on the region A12 adjacent to the region A11. As described above, the distal end surface 75*a* of the movable plate 75 is sequentially moved to the height L3*m* of the cavitated region A1*m*. As a result, the cavitation process can be performed on the consecutive regions A11 to A1*n*. Here, m and n are natural numbers, and n=m+1. Finally, the drive device 76 moves the movable plate 75 from the end of the opening 24 to the vicinity of the end of the inlet 21.

The obstruction body 3 is a deep portion in which the target hole 20*g* is blocked. As the obstruction body 3 moves while performing the cavitation process, the region where the cavitation process is performed also moves. As the obstruction body 3 moves from the opening 24 to the inlet 21, the cavitation process is performed on the entire side surface 22 of the target hole 20*g*. As a result, the entire side surface 22 of the target hole 20*g* becomes the processing region A1*g*.

It should be noted that, although it is not necessary to prohibit the cavitation process, when there is a region in which the cavitation process is unnecessary in a part of the target hole 20*g*, when the cavitation process is performed, the drive device 72 may move the movable plate 75 by skipping the region in which the cavitation process is unnecessary.

The drive device 76 may continuously move the movable plate 75 from the opening 24 to the vicinity of the inlet 21.

By the jet C1, the cavitation process is performed on the processing region A1*g*. By attaching the fifth cap 70 to the opening 24, the closing body 1 (the movable plate 75) closes the opening 24, and the target hole 20*g* becomes a closed hole. By ejecting the jet C1 into the target hole 20*g* from the outside of the target hole A1*g*, the cavitation process can be performed on the inner surface of the target hole 20*g*.

In the cavitation process, the nozzle offset distance between the nozzle 102 and the processing region A1*g* (the distance from the nozzle 102 to the obstruction body 3) has an appropriate distance. If the amount of movement of the obstruction body 3 is large, it may fall outside the range of an appropriate distance. In this case, the nozzle 102 may also be moved so that the nozzle offset distance becomes an appropriate distance.

Eighth Embodiment

The cavitation processing method of an eighth embodiment will be described. Also in the present embodiment, the cavitation processing apparatus 100 substantially the same as that of the first embodiment is used.

Figure 9A:
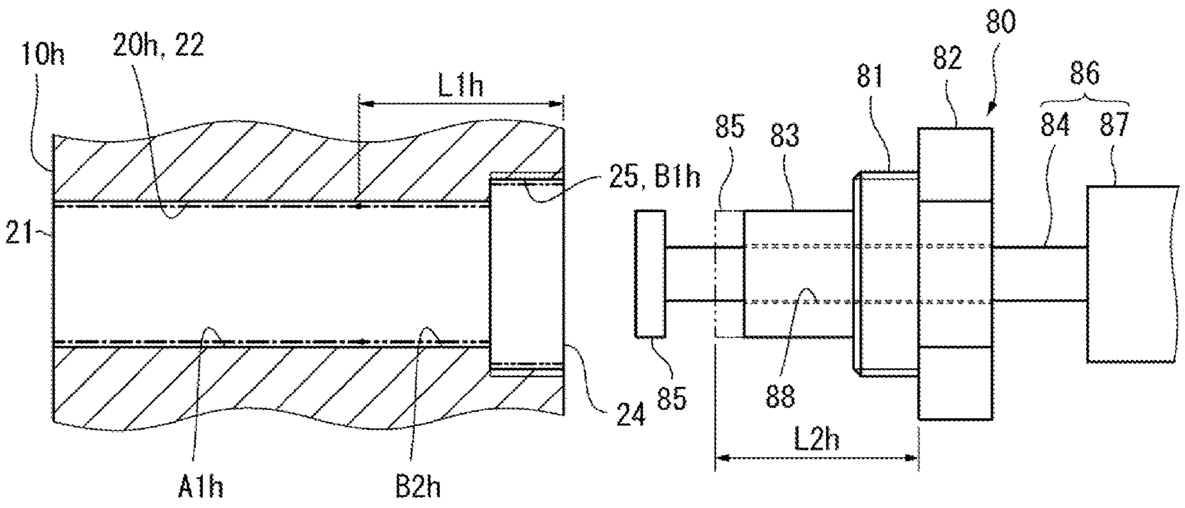
FIG. 9A is a longitudinal sectional view of a workpiece and a sixth cap according to an eighth embodiment.

As shown in FIG. 9A, in the cavitation processing method of the present embodiment, a workpiece 10*h* has a single target hole 20*h*. The target hole 20*h* is substantially the same as the target hole 20*b* of the second embodiment.

The workpiece 10*h* has non-processing regions B1*h*, B2*h* on the inner surface of the target hole 20*h*. In the workpiece 10*h*, as indicated by the two-dot chain line in FIG. 9A, the female thread portion 25 of the side surface 22 is the non-processing region B1*h*. A predetermined region adjacent to the female thread portion 25 is a non-processing region B2*h*. Here, the non-processing region B2*h* is a region where tolerances are specified for the inner diameter.

The target hole 20*h* has a processing region A1*h* on the inner surface. In the workpiece 10*h*, as indicated by the dashed-dotted line in FIG. 9A, the entire side surface 22 other than the non-processing regions B1*h*, B2*h* is the processing region A1*h*.

Figure 9B:
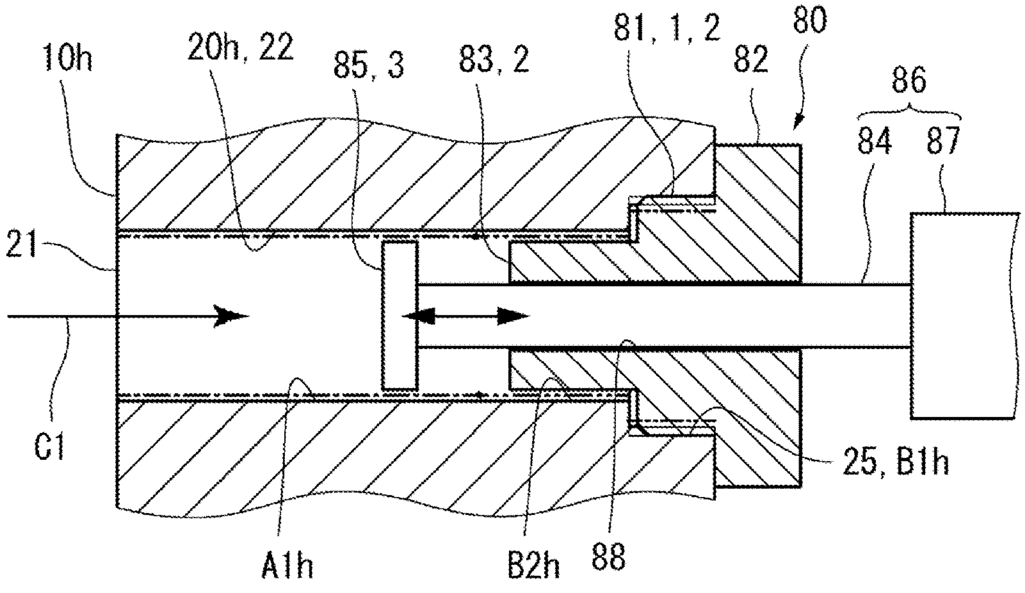
FIG. 9B shows the workpiece with the sixth cap according to the eighth embodiment attached.

As shown in FIG. 9B, in the cavitation processing method of the present embodiment, a sixth cap 80 is attached to the opening 24 of the workpiece 10*h*. The sixth cap 80 includes a male thread portion (closing body, cover body) 81, a head portion 82, a cover portion (cover body) 83, a movable plate (obstruction body) 85, and a drive device 86. The sixth cap 80 is formed with a through hole 88. The male thread portion 81, the head portion 82, the cover portion 83, and the through hole 88 are substantially the same as the male thread portion 51, the head portion 52, the cover portion 53, and the through hole 58 of the third cap 50. The movable plate 85 and the drive device 86 are substantially the same as the movable plate 75 and the drive device 76 of the fifth cap 70. That is, the drive device 86 includes a cylinder body 87 and a rod 84. The rod 84 passes through the through hole 88. The rod 84 has an outer diameter slightly smaller than the inner diameter of the through hole 88. The movable plate 85 is located toward the cover body 83. The cylinder body 87 is located toward the head portion 82. The sum L2*h* of the thickness of the movable plate 85, the width of the cover portion 83, and the width of the male thread portion 81 is substantially the same as the height L1*h* of the non-processing region B2*h*. Here, the height L1*h* of the non-processing region B2*h* is the length from the end of the non-processing region B2*h* on the inlet 21 side to the opening 24 (see FIG. 9A).

With the male thread portion 81, the head portion 82, and the cover portion 83 fixed, the drive device 86 moves only the movable plate 85. When the male thread portion 81 of the sixth cap 80 is screwed into the female thread portion 25 of the workpiece 10*h*, the opening 24 is closed by the male thread portion 81, and the non-processing region B1*h* (female thread portion 25) is covered by the male thread portion 81. The peripheral surface of the cover portion 83 faces the non-processing region B2*h* with a slight gap therebetween. That is, the cover portion 83 substantially covers the non-processing region B2*h* adjacent to the female thread portion 25. Further, the movable plate 85 is located adjacent to the processing region A1*h* and opposite from the inlet 21. That is, the male thread portion 81 functions as the closing body 1 that closes the opening 24, and functions as the cover body 2 that covers the non-processing region B1*h*. The cover portion 83 functions as a cover body 2 that covers the non-processing region B2*h*. The movable plate 85 functions as an obstruction body 3 that obstructs the flow of the jet C1.

The cover portion 83 and the non-processing region B2*h* may be in contact with each other. The cover portion 83 may be omitted. Even without the cover portion 83, the jet C1 does not contact the non-processing region B2*h* due to the movable plate 85. In this case, the movable plate 85 functions as the cover body 2. In this manner, the cavitation process is performed on the workpiece 10*h* with the sixth cap 80.

The step of the cavitation processing method of the present embodiment is substantially the same as the step of the cavitation processing method of the seventh embodiment.

By the jet C1, the cavitation process is performed on the processing region A1*h*. By attaching the sixth cap 80 to the opening 24, the closing body 1 (the male thread portion 81) closes the opening 24, and the target hole 20*h* becomes a closed hole. The jet C1 is ejected from the outside of the target hole 20*h* to the target hole 20*h*. Accordingly, the cavitation process can be performed on the processing region A1*h* on the inner surface of the target hole 20*h*. As the flow of the jet C1 is obstructed by the obstruction body 3 (the movable plate 85), the cavitation process is performed on the processing region A1*h* of the inlet 21 side of the obstruction body 3. The processing region A1*h* is in the vicinity of the obstruction body 3. The obstruction body 3 is a deep portion in which the target hole 20*h* is blocked.

As the obstruction body 3 moves while the cavitation process is performed, the region where the cavitation process is performed also moves. As the obstruction body 3 moves from the position adjacent to the processing region A1*h* and opposite from the inlet 21, to the inlet 21, the cavitation process is performed on the entire side surface 22 other than the non-processing regions B1*h*, B2*h*. As a result, the entire side surface 22 other than the non-processing regions B1*h*, B2*h* becomes the processing region A1*h*. As the non-processing regions B1*h*, B2*h* are covered by the cover body 2 (the male thread portion 81 and the cover portion 83), the jet C1 is not contacted. The cavitation process is not thus performed on the non-processing region B1*h*, B2*h*.

When there is a female thread portion or a non-processing region near the inlet 21 of the target hole 20*h*, the cavitation process is performed with the third cap 50 attached to the inlet 21.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST

1 Closing body
2 Cover body
3 Obstruction body
10, 10*a*, 10*b*, 10*c*, 10*d*, 10*e*, 10*f*, 10*g*, 10*h* Workpiece
20, 20*a*, 20*b*, 20*c*, 20*d*, 20*e*, 20*f*, 20*g*, 20*h* Target hole
21 Inlet
24 Opening
58 Through hole
102 Nozzle
A1*a*, A1*b*, A1*c*, A1*d*, A1*e*, A1*f*, A1*g*, A1*h* Processing region B1*b*, B1*c*, B1*d*, B1*e*, B1*f*, B1*h*, B2*d*, B2*e*, B2*f*, B2*h* Non-processing region C1 Jet

What is claimed is:

1. A cavitation processing method, comprising:

attaching a cap having a through hole to an inlet of a target hole of a workpiece, the target hole having the inlet and an opening;

closing the opening with an obstruction body configured to obstruct a flow of a jet of a processing liquid;

immersing the workpiece and a nozzle into the processing liquid;

ejecting the jet of the processing liquid from the nozzle located outside of the target hole to an inside of the target hole through the through hole such that a cavitation process is performed on a processing region that is located downstream of a non-processing region covered by the cap on an inner surface of the target hole; and moving the obstruction body along the flow direction of the jet while ejecting the jet, the obstruction body located downstream from the processing region in the flow direction of the jet.

2. The cavitation processing method according to claim 1, wherein the nozzle has an outer diameter larger than an inner diameter of the inlet.

3. The cavitation processing method according to claim 1, wherein the inlet includes a female thread portion partially in the non-processing region, and the cap includes a male thread portion configured to be screwed into the female thread portion.

4. The cavitation processing method according to claim 2, wherein the inlet includes a female thread portion partially in the non-processing region, and the cap includes a male thread portion configured to be screwed into the female thread portion.

* * * * *